E. E. GOLD.
LOCK FOR COUPLINGS.
APPLICATION FILED FEB. 2, 1911.

1,021,982.

Patented Apr. 2, 1912.

WITNESSES:
Rene' Bruine
Fred White

INVENTOR:
Edward E. Gold,
By Attorneys,
Fraser, Firth & Myers

UNITED STATES PATENT OFFICE.

EDWARD E. GOLD, OF NEW YORK, N. Y.

LOCK FOR COUPLINGS.

1,021,982.  Specification of Letters Patent.  Patented Apr. 2, 1912.

Application filed February 2, 1911. Serial No. 606,210.

*To all whom it may concern:*

Be it known that I, EDWARD E. GOLD, a citizen of the United States, residing in the borough of Manhattan, city, county, and State of New York, have invented certain new and useful Improvements in Locks for Couplers, of which the following is a specification.

My invention relates to locks for couplers such as are used for coupling air hose or steam hose upon railway trains, and has for its object to provide a positive lock that shall be simple and efficient in operation, will be unlikely to be broken or to get out of order, will positively engage and lock couplers even though the respective parts of the coupler be of different types, will compensate for wear upon the parts and will at all times fold the ports tightly together notwithstanding such wear, and which will hold such couplers together though only one lock be used.

To this end my invention consists in a bolt capable of being rocked about a longitudinal axis mounted upon one half part of such coupler, having its end bent or offset so that it is capable of swinging over the overlapping end of the other coupler, and in combining therewith means for positively retaining such bolt in locking position.

A desirable form of construction is illustrated in the accompanying drawings, wherein,—

Figure 1:
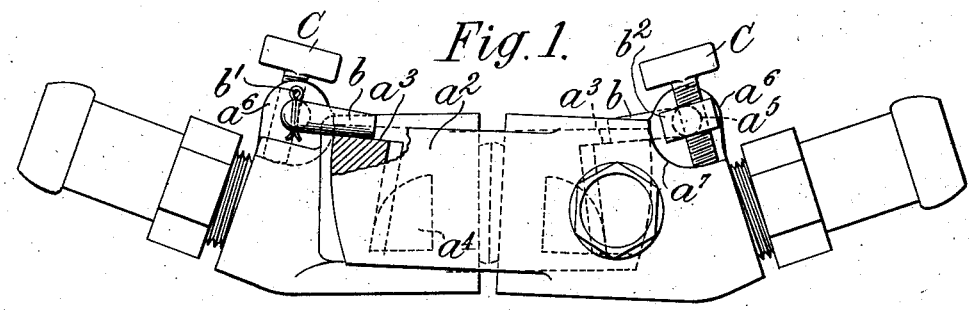
Figure 2:
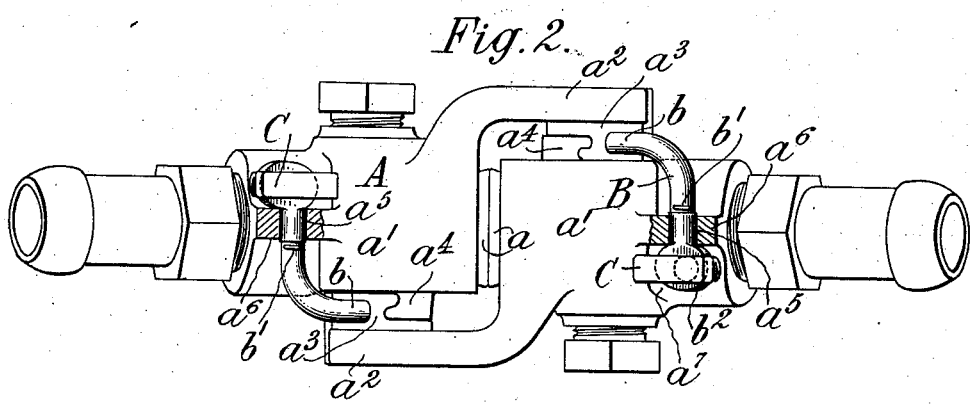
Figure 4:
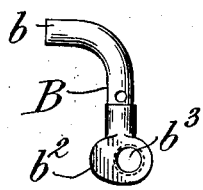
Figure 5:
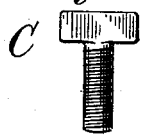
Figure 3:
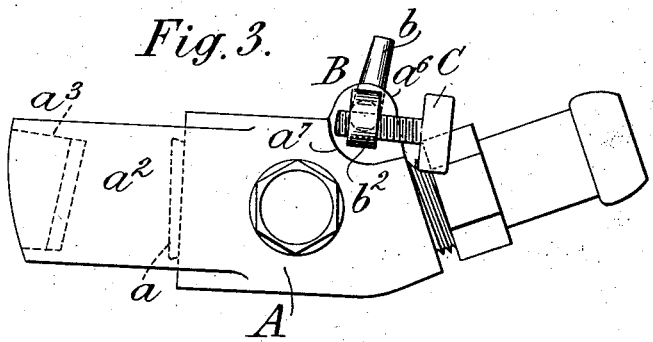

Figure 1 is a side view of two parts of a coupler containing my invention; Fig. 2 is a plan view thereof; Fig. 3 is a side view of one member of such coupler illustrating the bolt swung by gravity to uncoupling position; Fig. 4 is a detail view of the bolt; and Fig. 5 a similar view of the set-screw.

While my improved lock is not limited in its application to any particular style or manufacture of coupler and is capable of being applied to many varieties of couplers which differ in details of construction, I have illustrated the same in connection with a coupler such as is described and shown in my Patent No. 913,950 of March 2, 1909. The coupler illustrated has two parts or members A which are duplicates. Each of said coupling members has a direct port $a$ at the inner end of its body portion $a^1$. Upon each member of the coupler there is formed an extension $a^2$ which projects forwardly from one side of the body portion into overlapping engagement with the body portion of the mating coupler. Upon such extension $a^2$ is formed a flange $a^3$ which has a locking engagement with a projection $a^4$ upon the body portion, which flange and projection together serve to force the two coupler members A together as the said flange and projection are forced into engagement with each other.

My invention relates to the locking means provided for holding the two coupler members in coupling position. Such means comprise a bolt which is mounted upon one of the members so as to rock or turn, and which at its opposite ends has respectively a locking portion and a holding portion. In the form illustrated the bolt has two eccentric portions which are turned in opposite ways. One eccentric is in the form of a bent end, and the other eccentric lies in the head and is adapted to turn the locking portion to locking or unlocking position.

The locking member as illustrated consists in a bolt B which may have a tapered or reduced end $b$ for ease in assembling. Such tapered end permits the bolt when bent to be inserted through the bearing $a^5$ in the lug $a^6$ with which such couplers are usually provided. The bolt after insertion may be held in position at one side by the cotter pin $b^1$, which is passed through the bolt close to the lug $a^6$. The bolt is held from movement in the opposite direction by its enlarged head.

The free end of the bolt is provided with an eccentric projection or offset portion to permit the bolt to engage over the overlapping portion of the mating coupler. Such projection in the bolt illustrated is provided by bending the end $b$ of the bolt to substantially right angles with the body of the bolt, which is of such length that when the bolt is in place in the lug $a^6$, the said end $b$ will be adapted to be swung over the overlapping portion of the mating coupler and force the same to coupling position. Such effect will follow in the particular form of coupler illustrated by reason of the end $b$ engaging a part of such overlapping portion $a^2$, as for instance the flange $a^3$, and forcing the same down upon the lug $a^4$, thereby drawing the two parts of the coupler together.

The rocking or turning of the bolt B is accomplished as illustrated by a set-screw C which is threaded into a hole $b^3$ in the enlarged head $b^2$ of the bolt, and which is located eccentric to the longitudinal axis of the bolt. It is on the opposite side of such axis from the end $b$. The lower end of the set-screw C rests against the body $a^1$ of the coupler when the bolt is turned to locking position and the said set-screw has been seated. The body portion inside of the seat for the set-screw C is formed into a curved face $a^7$, which when the set-screw is unseated permits the bolt to turn by reason of the weight of the head of set-screw C overcoming the weight of the end $b$, until the bolt is in the position shown in Fig. 3.

The construction hereinabove illustrated and described, by reason of the fact that the projection upon the rocking bolt B engages the overlapping arm $a^2$ free and clear of the adjacent body portion $a^1$, permits the rocking of the said bolt B to force the said arm down sufficiently to bring the ports together, and this irrespective of any compression of the gaskets or wear upon the said gaskets or wear upon the other parts. Thereby the said lock compensates for wear upon the said coupler, and, notwithstanding such wear, at all times produces an efficient positive lock which holds the ports snugly together and prevents leakage.

Although I have described with much circumstantial detail the particular form of lock illustrated, I do not deem my invention necessarily limited to such precise illustrated form, as modifications may be made therein within the limits of the appended claims.

I claim as my invention:—

1. A lock for couplers having overlapping members comprising a bolt, a bearing therefor in one of said members which permits the bolt to turn, a projection upon one end of said bolt adapted to be turned into locking engagement with the overlapping member, and a set-screw engaging said bolt eccentrically to its longitudinal axis and adapted to turn said bolt in said bearing to locking position and to hold it in such position.

2. A lock for couplers having overlapping members comprising a bolt, a bearing therefor in one of said members which permits the bolt to turn, a projection upon one end of said bolt adapted to be turned into locking engagement with the overlapping member, and locking means eccentrically mounted in said bolt and adapted when operated to turn said bolt to locking position and positively lock the same in such position and when released to automatically swing said bolt out of locking position.

3. A positive lock for couplers having overlapping members, comprising a bolt adapted to be rocked into and out of locking position, a bearing for said bolt upon one member, one end of said bolt being offset from the body thereof and adapted to engage and lock the overlapping member when the bolt is rocked into locking position, and a set-screw threaded into said bolt eccentrically to its longitudinal axis and adapted to rock said bolt to locking position and to hold the same in said position.

4. A positive lock for couplers having overlapping members, comprising a bolt adapted to be rocked into and out of locking position, a bearing for said bolt upon one member, one end of said bolt being offset from the body thereof and adapted to engage and lock the overlapping member when the bolt is rocked into locking position, and a set-screw threaded into said bolt eccentrically to its longitudinal axis and adapted to rock said bolt to locking position and to hold the same in said position, and when released to turn said bolt by gravity to unlocking position.

5. A positive lock for couplers having overlapping members comprising a bolt, having its end reduced in diameter and offset from the body, and a bearing for said bolt upon one member which permits the bolt to be rocked into and out of locking position, a set-screw eccentrically threaded into said head and adapted to rock the bolt to locking position, and to hold it in such position.

6. A positive lock for couplers having overlapping members comprising a bolt, having its end reduced in diameter and offset from the body, and a bearing for said bolt upon one member which permits the bolt to be rocked into and out of locking position, a removable stop for holding the bolt in said bearing, and an enlarged head coöperating with such stop to retain the bolt in position, and means for positively holding the bolt in locking position.

7. A positive lock for couplers having overlapping members comprising a bolt, having its end reduced in diameter and offset from the body and adapted to be turned to engagement with the overlapping member, and a bearing for said bolt upon one member which permits the bolt to be rocked into and out of locking position, a removable stop for holding the bolt in said bearing, an enlarged head coöperating with such stop to retain the bolt in position, and means for locking the bolt comprising a set-screw eccentrically threaded into said head and adapted to turn the bolt to locking position and to lock the same.

8. A positive lock for couplers comprising a bolt mounted to rock in one member of said coupler, and having oppositely extending projections on its ends, one of said projections having a set-screw adapted to turn the bolt to locking position and to positively hold the same in such position and the other projection adapted to engage a portion of the other member of the coupler and lock the couplers together.

9. A positive lock for couplers, comprising a bolt mounted to rock in one member of said coupler and having oppositely extending projections on its ends, one of said projections having a set screw adapted to engage against the body of the coupler and to turn the bolt to locking position and to positively hold the same in such position, and the other projection adapted to be brought into engagement with the other member of the coupler by the turning of the bolt and to lock the couplers together.

10. In couplers having mating members each provided with a direct port and comprising a body portion having a side projection and an arm adapted to overlap the body of the mating coupler and having a flange coöperating with said side projection as the couplers are assembled to draw the ports together, a lock for positively holding said couplers together comprising a bolt mounted to rock in one member of said coupler and having oppositely extending projections, one of said bolt projections carrying a set screw adapted to engage one of said overlapping members and adapted to force the other bolt projection into engagement with the other overlapping member, whereby said coupler members are positively locked in coupled position and said set screw and the other bolt projection each adapted to engage one of said overlapping members free of contact with the other overlapping member, whereby said arm may be forced farther down as the parts wear and said lock will compensate for such wear.

11. In couplers having mating members each provided with a direct port and comprising a body portion having a side projection and an arm adapted to overlap the body of the mating coupler, and having a flange coöperating with said side projection as the couplers are assembled to draw the ports together, a lock for positively holding said couplers together comprising a bolt mounted to rock in one member of said coupler and having oppositely extending projections, one of said bolt projections adapted to extend over said arm and to engage the same free of the said body as the bolt is rocked, and the other projection having a set screw adapted to engage against the body of the coupler and to turn the bolt to locking position and to positively hold the same in such position, whereby said lock is adapted to compensate for wear upon the parts and to draw said ports at all times close together notwithstanding such wear.

In witness whereof, I have hereunto signed my name in the presence of two subscribing witnesses.

EDWARD E. GOLD.

Witnesses:
HENRY M. TURK,
FRED WHITE.

Copies of this patent may be obtained for five cents each, by addressing the "Commissioner of Patents, Washington, D. C."